Figure 1:
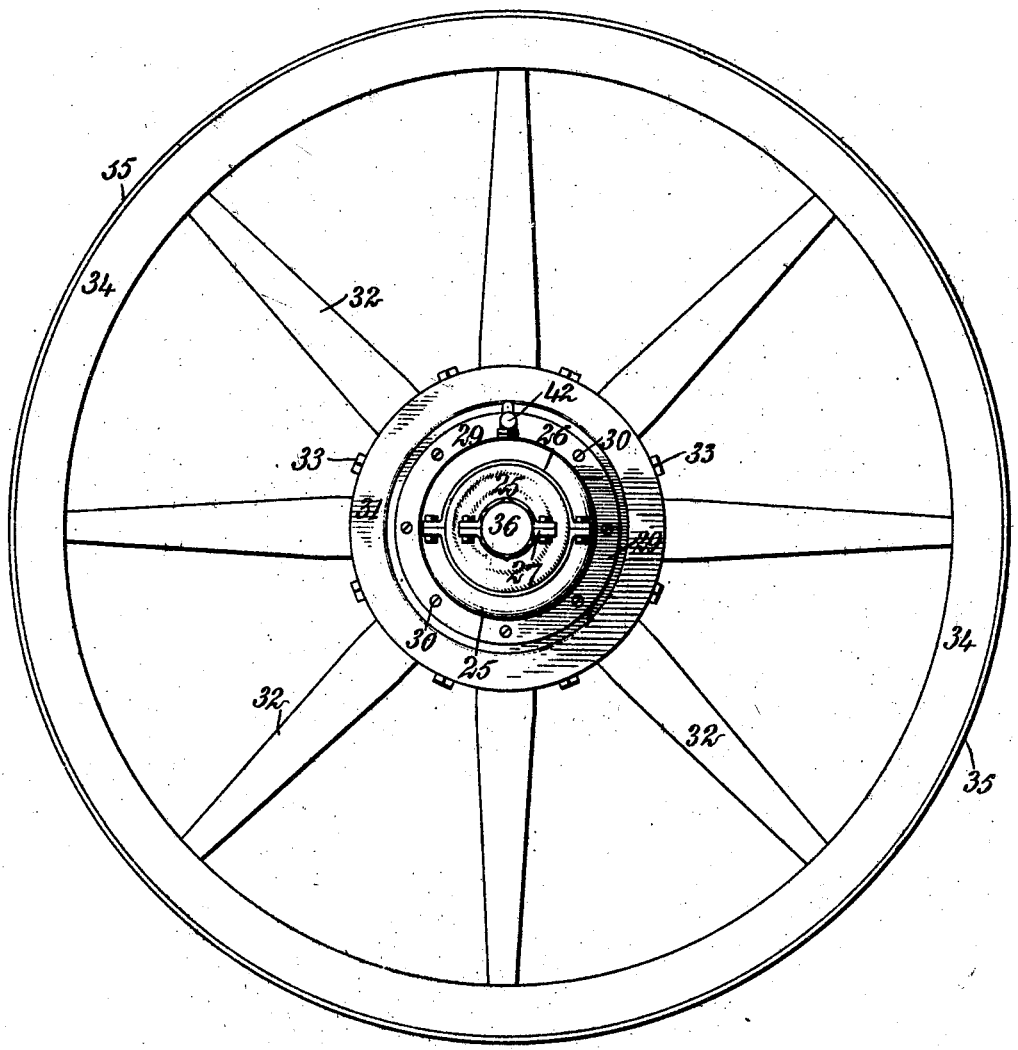

No. 861,792. PATENTED JULY 30, 1907.
M. G. BABIO.
VEHICLE WHEEL.
APPLICATION FILED JULY 14, 1906.

4 SHEETS—SHEET 1.

WITNESSES

INVENTOR
Manuel Gonzalez Babio
BY
ATTORNEYS

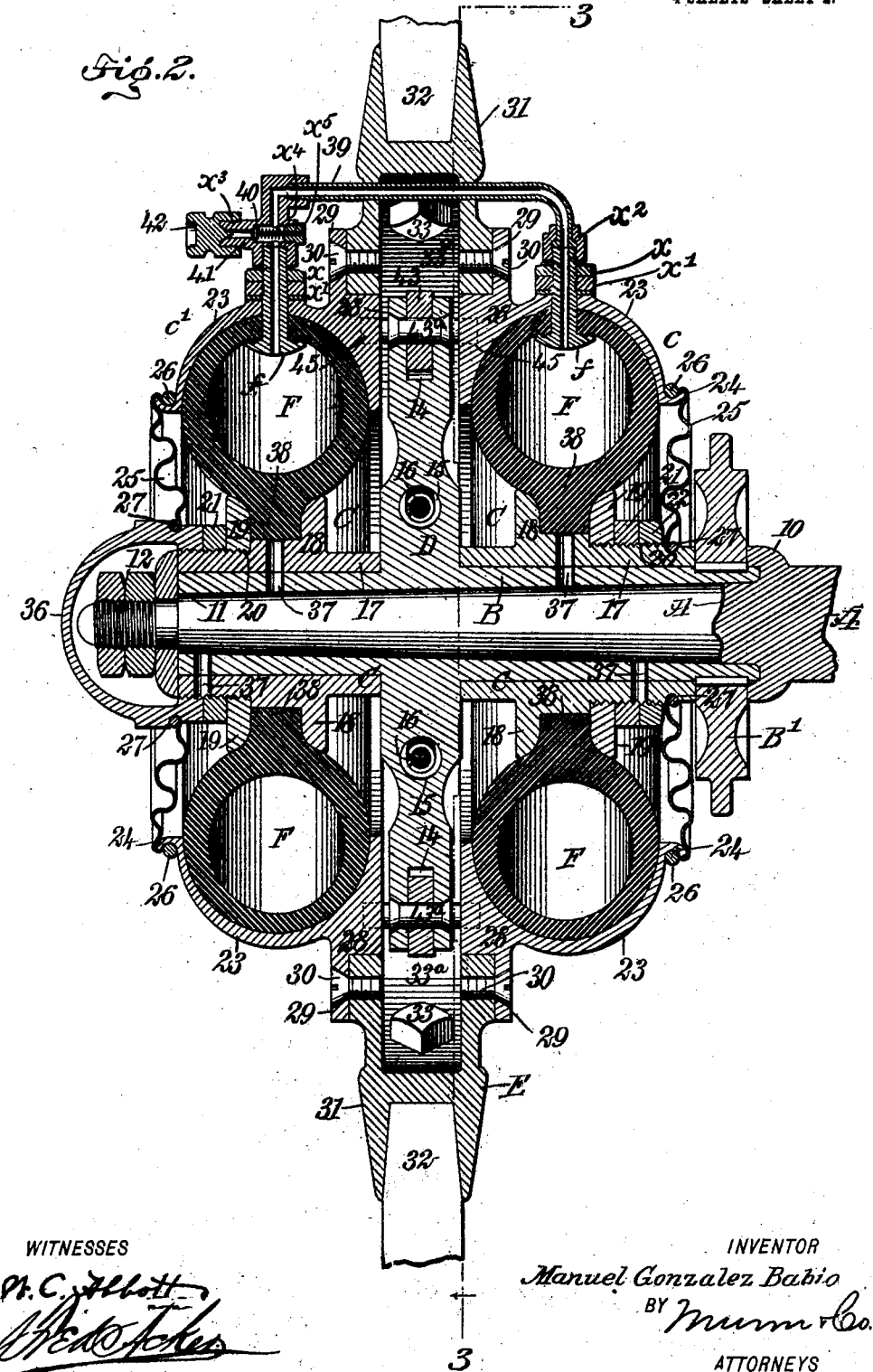

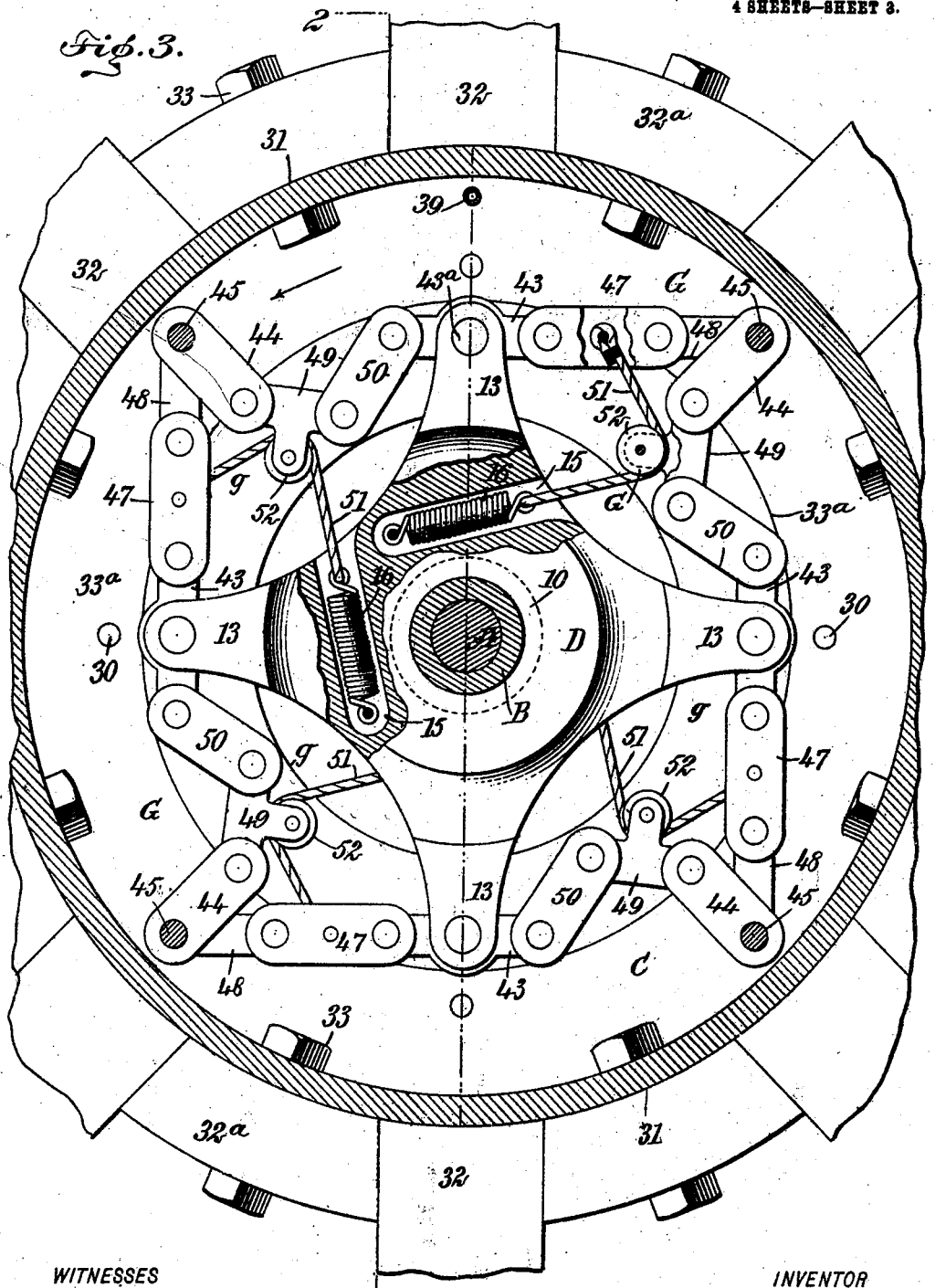

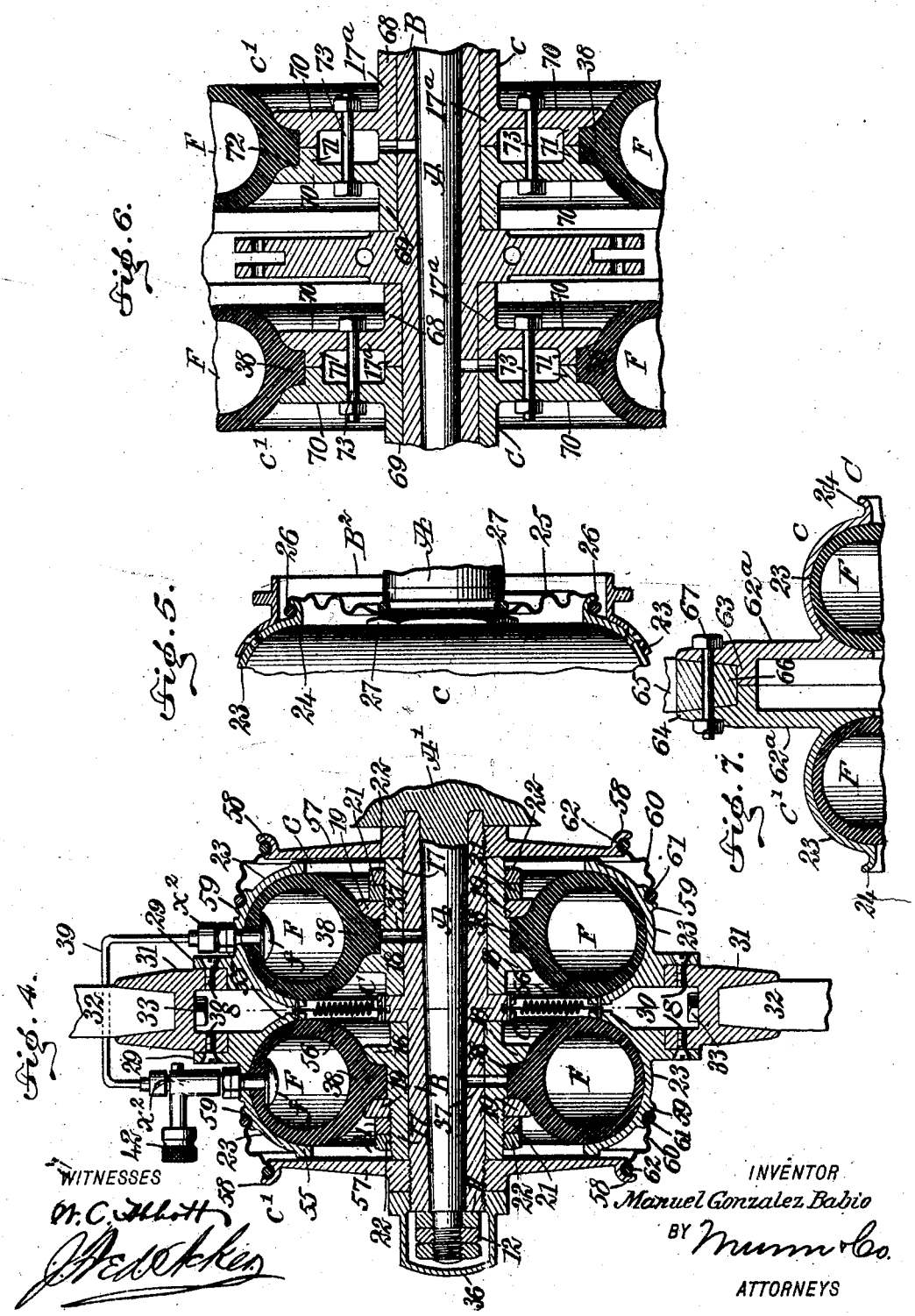

UNITED STATES PATENT OFFICE.

MANUEL GONZALEZ BABIO, OF NEW YORK, N. Y.

VEHICLE-WHEEL.

No. 861,792.　　　　　Specification of Letters Patent.　　　　　Patented July 30, 1907.

Application filed July 14, 1906. Serial No. 326,256.

*To all whom it may concern:*

Be it known that I, MANUEL GONZALEZ BABIO, a subject of the King of Spain, and a resident of the city of New York, borough of Manhattan, in the county and State of New York, have invented a new and useful Improvement in Vehicle-Wheels, of which the following is a full, clear, and exact description.

My invention relates to an improvement in vehicle wheels, or wheels which are particularly adapted for use in connection with automobiles and the like, and primarily to provide such wheels with a novel principle of twin pneumatic tubes to be hereinafter described.

A further purpose of the invention is to improve upon the construction shown in the patents granted to me January 2nd, 1906, No. 809,040, and February 13th, 1906, No. 812,629, whereby to add to the general efficiency of the wheel for light and for heavy service.

The principal factor of the invention is the new principle above mentioned of locating between the main and secondary hubs parallel twin pneumatic tubes whereby to obtain among others the following advantages, namely, more stability in the upright position of the wheel without so much friction by the contact of the side disks with the secondary hub as in wheels where a single tube only is used. Wheels provided with said twin pneumatic tubes are particularly adapted for light vehicles, inasmuch as the side disks will be omitted, and therefore all friction is avoided, and any lateral motion imparted to the vehicle from a shock will be comparatively imperceptible, and since the wheel under severe tension is not rigid, but more or less yielding, the life of such wheels is prolonged to a maximum extent. By reason of said pneumatic tubes in the wheels greater flexibility is obtained, since the air pressure required for the twin tubes will be less than that required for a single tube to perform the same amount of work.

A further purpose of the invention is to add to the efficiency of the motive power applied to the wheels, by reason of the drive elements or chains connecting both hubs (referring to driving wheels only), being located in the line of their central vertical sections, and therefore the transmission of power is directed to the central vertical sections of the wheels, while the action of the chains on the wheels for which patents have been granted me, is at the sides of the wheels and not at their central vertical sections.

Again, the improved construction of twin pneumatic tubes charged at lower air pressure than if there were only one tube reduces to the minimum the probability of the escape of air, and the rebound caused by passing over ditches or obstructions in the road is also reduced to a minimum by reason of the exceedingly great flexibility of the twin tubes, derived from the reduced air pressure at which they are charged compared with an ordinary single tube.

Further, I aim by my improvements to o  in more comfort and safety for the occupants of the vehicles to which the wheels are applied, for the reason that such wheels traveling on a rough road are not liable to rigid lateral strain, or dishing strain, since they can play more or less on one side or the other when supported by said twin tubes without transmitting intense shocks to the body of the vehicle, and as a consequence thereof the probability of breakage is also reduced to a minimum. At the same time it will be readily understood that practically complete safety is assured against accidents arising from punctures, wear and tear and dishing strain, which are the most dangerous factors in wheels provided with the customary pneumatic tires.

This application provides for two sets of wheels, namely, the wheels employed as drivers and which have their main and secondary hubs connected by chains or their equivalents, and wheels used simply as supporting wheels, wherein the connecting chains are omitted, and the main and secondary hubs are free to turn one on the other, as it will be explained hereinafter, but may be positively connected to turn together, and both forms of wheels are designed with twin pneumatic tubes, which have a cushion action relative to the rim and the outer or secondary hubs of the wheel.

Another purpose of this invention is to provide a wheel with metallic tires, or with both metallic and solid rubber tires, since in this manner a true circle in the wheel is obtained and less resistance is to be overcome by the driving power than where a pneumatic tire is employed.

The feature of the wheels described in the patents above referred to, and which is present in a still greater degree in the present invention, is that when the car is in motion and the driving power is applied to the inner or main hub, a certain percentage of the weight of the car is sustained by the connecting chains for the hubs, and the axle has less propensity to transmit shocks to the body of th  vehicle, and at the same time it is a relief for the pneumatic tube employed.

Another purpose of the invention is to so construct the improved wheels as to lessen their propensity to skid or slip, since, if it is desired, the driving wheels for automobiles may be made larger in diameter than those now in use, and when power is applied to the inner or main hub it is transmitted to the outer or secondary hub in the diagonal direction of the connecting working chains, which also materially tends to reduce slipping since the driving power is thus converted from a circular to an approximate tangential motion.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 8:
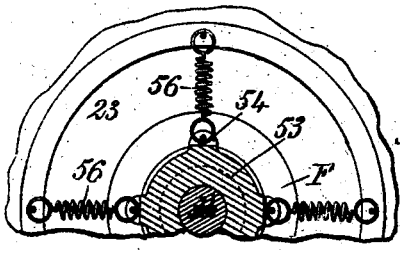

Figure 1 is a side elevation of the improved driving wheel; Fig. 2 is an enlarged vertical section through the hub of the wheel, the section being taken practically on the line 2—2 of Fig. 3; Fig. 3 is an enlarged vertical section through the hub portion of the wheel, the section being taken at right angles to that shown in Fig. 2 and practically on the line 3—3 of said Fig. 2; Fig. 4 is a vertical section through the hub portion of the wheel of a slightly different construction, said wheel not being adapted as a driver, differing in that respect from the wheel shown in Figs. 1, 2 and 3, and the view is drawn upon a smaller scale; Fig. 5 is a sectional side elevation of the inner end portion of the hub and spindle of the wheel shown in Fig. 2, illustrating another manner of driving; Figs. 6 and 7 are vertical sections through the hub portions of other slightly modified forms of the wheel; and Fig. 8 is a vertical section taken substantially on the line 8—8 of Fig. 4.

A represents a spindle on an axle A′, and the said axle where the spindle connects with it is provided with an exterior cupped flange 10. The spindle A is provided with the customary reduced threaded outer end portion.

In the construction of the body of the wheel two hubs are employed, an inner or main hub B and an outer or secondary hub C. The inner or main hub B turns freely on the spindle A, and its inner end portion is within the flange 10 of the axle A′. However, when the motive power is applied to the axle A′ the spindle A can be secured in the inner hub in any suitable manner. The outer or secondary hub C is loosely mounted on the inner or main hub B and has movement around the same to a limited extent, as will be hereinafter made plain. Said outer or secondary hub C is constructed in two sections c and c′ in connection with a central ring to be described hereinafter, each of which sections is practically identical in the details of its construction except that the inner section c is of slightly larger diameter than the outer section c′, in order that the material at the inner end of the primary hub shall not be thinner than that of its outer end by the tapering for the spindle's axle.

The two hubs are held in place relatively to each other by means of twin pneumatic tubes F, and to the spindle A by means of a washer 11 and nuts 12 located at the reduced outer end portion of said spindle, as is clearly shown in Fig. 2; and the inner end of the inner section c of the secondary hub C is made to abut preferably against a driving sprocket B′ which is keyed or otherwise secured to the inner end portion of the inner or main hub B, as is particularly shown in Fig. 2. The sections c and c′ of the outer or secondary hub C are separated by and lie close to what I denominate a transmitting wheel D, which transmitting wheel D is either integral with or is attached in any suitable manner to the inner or main hub B at about the central portion of its length. As is shown in Fig. 3 this transmitting wheel D is practically a star wheel, and as shown is provided with four points 13, but I do not confine myself to any particular number of points in the construction of the transmitting wheel.

Each point 13 of the transmitting wheel D is provided with a longitudinal slot 14 at its end portions to receive a connecting medium between the two hubs and to be hereinafter described, and each point 13 of the transmitting wheel adjacent to its hub or body portion is provided with a pocket 15. These pockets extend to the outer edge of the point adjacent to which they are formed, and said pockets 15 extend in different directions, being preferably at right angles to each other as is illustrated also in Fig. 3. Each of the pockets 15 contains a spring 16, a coiled spring for example, and the inner ends of these springs 16 are secured in any suitable or approved manner adjacent to the closed end wall of a pocket. These springs 16 are adapted for attachment to the aforesaid connecting medium between the hubs as will be also hereinafter clearly explained.

In the construction of the sections c and c′ of the outer or secondary hub C, a body sleeve 17 for each section is provided, and these sleeves are fitted loosely yet conform to the outer and inner portions or sections of the primary hub B, one at each side of the transmitting wheel D. Each body sleeve 17 of the secondary hub is provided near its inner end or that end which is adjacent to the transmitting wheel D, with an annular outwardly-extending flange 18, and at the outer portions of the said body sleeves of the primary hub an exterior thread 20 is formed. On this threaded outer portion of each body sleeve 17 a ring flange 19 is secured, said flanges 19 being opposed to the fixed flanges 18; and the inner faces of both of these flanges 18 and 19 at their peripheral portions are preferably more or less curved. The ring flanges 19 are held in place upon the body sleeves 17 of the primary hub by means of rings 21 and 22 screwed upon the threaded portions of said body sleeves to an engagement with one another and the ring flanges 19 as shown in Fig. 2, but other means may be devised for holding said flanges 19 in said position without departing from the spirit of the invention.

It will be observed that at the outer end of the sleeve 17 in section c′, instead of a circular ring 22 on the outer sleeve 17, a nut-cap is employed in connection with a corrugated dust guard, as will be explained hereinafter. In connection with the said body sleeves 17 of the primary hub there is a corresponding inner circular chamber or rim section 23 of the secondary hub C. Each of these sections 23 is in the nature of a hollow ring with a peripheral flange 29 and they may be denominated lateral circular supports whose rim circumference is much greater than the circumference of the body sleeves 17 in connection with which they are employed in combination with the pneumatic tubes. Each rim section 23 is preferably convexed at its outer face and concaved at its inner face, being invariably of the latter formation as it may be required for the twin tubes, and each rim section 23 of the secondary hub C is provided at its marginal edge with an outwardly extending flange 24, more or less curved at its outer portion. These flanges on the rim sections 23 of the secondary hub are adapted to hold one edge each of a corrugated dust guard 25, which dust guard is made of a weather-proof yet pliable material, as for example rubber or other material or a combination of materials as practice may justify, and each dust guard 25 employed covers or closes the space which occurs between the outer marginal edges of the rim sections 23 and the outer exterior end portions of the body sleeves 17, as is clearly shown in Fig. 2. The dust guards are held in firm engagement with the said flanges 24 by means of rings 26, and these rings are preferably divided and have their ends brought together and secured by bolts, as shown in Fig. 1, but other forms of clamping devices may be employed. The inner marginal portion of the inner dust guard of the wheel is secured in place by a smaller band or split ring 27 entering an annular groove in the outer end portion of the inner body sleeve 17 of the section $c$, while in the attachment of the outer dust guard 25, or that used in connection with the section $c'$ the inner marginal portion of such dust guard is secured by a clamp or ring 27, of the construction described, to the inner portion of a cap 36, which cap is made to cover the washer and nuts at the outer end of the spindle as is shown in Fig. 2; and the said cap is preferably screwed upon the outer threaded surface of the body sleeve 17 of the said hub section $c'$, as shown in Fig 2. But it will be understood that other means may be employed for making the attachment, since the cap 36 is not essential to the invention.

In the construction of the rim members 23 of the sections of the secondary hub C, enlargements 28 are provided at their inner or opposing faces, which enlargements are flattened so as to be in vertical alinement with the inner ends of the body sleeves 17 of said sections as is also shown in Fig. 2; and at the marginal surface of the enlargements 28 outwardly-extending and parallel annular flanges 29 are formed, and these flanges are attached by means of screws 30 or their equivalents to the lateral shoulders of a central rim 31, which has a peripheral channel adapted to receive the inner ends of the spokes 32 and the necessary spacing blocks $32^a$. The spacing blocks are held in position in the rim 31 by means of bolts 33 or their equivalents, said rim 31 being provided with an inner annular chamber $33^a$ in which the heads of bolts 33 are located. The spokes 32 are secured to the outer rim 34 or felly as the case may be, and the outer rim or felly 34 is provided with a metal tire 35, or with both a metal and a solid rubber tire or a tire of any desired material, since the cushioning of the wheel is performed at the hub portion thereof.

In order to hold the body sleeves 17 in proper position relatively to the inner or main hub B and the secondary hub C, when the flange 19 and the rings 21 and 22 are being placed in position, openings 37 are made in the body sleeves and in the main hub, through which an instrument may be passed while the said parts 19, 21 and 22 are being placed in positoin. But other means may be employed for accomplishing such results, and the rim members 23 of the sections $c$ and $c'$ may be attached to the central rim 31 in a manner other than that shown and described.

The necessary elasticity or cushioned effect is imparted to the wheel through the employment of the two pneumatic tubes F, or in other words by the use of twin pneumatic tubes. These tubes are located between the inner faces of the rim members 23 of the sections $c$ and $c'$ of the outer or secondary hub and the outer portions of the flanges 18 and 19 carried by the body sleeves 17 of such sections, as is best shown in Fig. 2;

and each of said pneumatic tubes F is provided with an annular rib 38 at its inner circumferential surface, and said ribs 38 fit into the spaces that intervene between the aforesaid flanges 18 and 19. While the ribs 38 are desirable in connection with the body sleeves for holding the primary hub in central position with relation to the secondary hub, other or equivalent means may be adopted to accomplish the same result, as for instance omitting the said ribs 38 and making the necessary changes in the body sleeves and their constituent parts as may be convenient.

The outer faces of the tubes F fit snugly to the inner concaved surfaces of the rim members 23 of the secondary hub; and it will be understood that the body of each tube F in cross section is of the same diameter throughout, or it may be increased for the tube in section $c$ if desired.

The interior and exterior diameters of the pneumatic tube in the section $c$ are slightly larger than those of the other tube in the section $c'$ in order that the tapering of the primary hub shall not be thinner at its inner section than the other outer section, and it is understood that the body of each tube F and the lateral support 23 can be increased in diameter as it may be required to bear a proportional relation to the spindle A so as to obtain the best results. Each pneumatic tube F is provided with a hollow stem $f$ passing through the tube and extending out through suitable glands formed at the outer portions of the rim members 23 of the secondary hub, and the said stems are secured thereon by means of a nut and lock nut $x$, $x'$. Said stems $f$ are united by a connecting pipe 39 passing through the rim 31 forming part of the secondary hub, and as shown, one end of said pipe is provided with a clamp nut $x^2$ screwed on the stem $f$ while the other end is also screwed in a mouth piece 41, and the latter is screwed on the other stem $f$, making thus a free passage for air communication from one tube to the other. The said mouth piece 41 is provided with an integral nipple $x^3$ within which is located a check valve 40 of any approved or required type, and opposite to said nipple $x^3$ it is provided with an opening $x^4$ through which the said check valve 40 can be put in position, and said opening is afterwards closed by a plug $x^5$. It will be observed that the mouth piece 41 is adapted for connection with an air pump or its equivalent when the tubes are to be inflated. The said mouth piece is normally closed by a plug or cap 42. By thus connecting the hollow stems $f$ for the twin tubes, both of said tubes are inflated at the same time and the air pressure in each will be equal.

It is very evident that when twin pneumatic tubes F are employed, placed side by side, the wheel may be made very much wider in tread than ordinarily, and that comparatively speaking the air pressure in the twin tubes will be less than that required for a single tube for doing the same amount of work, and that the pressure on the single tube would necessarily be sustained more or less at the central portion of the tread; whereas, when the twin tubes are employed the pressure is equally sustained at each side of the center of the tread. It is also evident that with this novel construction of hubs the twin tubes (under the new principle to be hereinafter described) will be charged at less air pressure as stated and therefore more flexibility is obtained, there is less probability of air escape, friction between the disks of the primary hub with the secondary hub is reduced to a minimum and it is entirely avoided by omitting said disks in the wheels when they are made for light vehicles, the upright position of the wheel is steadier than if there were only one tube, the life of the tube and all the constituent parts of the wheel is greatly prolonged, and the comfort of the occupants of the vehicle is increased because there is no frequent trouble and accidents arising from punctures and dishing strain as is the case with pneumatic tires, and the rebounds or shocks in passing over ditches or obstructions in the road are reduced to a minimum by reason of the great flexibility of the twin tubes. All this has been mentioned in the preamble of this specification, as well as some other important features of the invention, and there is no need of repeating the same here.

When the wheel is to be used as a driving wheel, the main or primary hub B has a flexible connection G with the secondary hub C, said connection being established through the medium of a transmitting wheel D. This flexible connection G is preferably in the form of a chain, which includes a span or a section $g$ between each two adjacent points or spurs 13 of the said transmitting wheel D as shown in Fig. 3. In constructing the spans $g$ a link 43 is pivoted at its center by means of suitable pins 43ª in the end opening 14 of each of the points or spurs 13, as shown also in Fig. 2. The intermediate link 44 of each span is pivotally connected at its outer end by a pin 45 with the inner side portions of the central rim 31; that is to say, the pivot pins 45 for the links 44 pass through the chambered portion 33ª of said rim 31. In further making up a span or section $g$ of said chain, a link 47 is pivotally connected with one end of a centrally pivoted link 43, and a shorter or connecting link 48 is pivotally connected with a link 47 at its opposite end and with a pivot pin 45 as shown in Fig. 3. A link 50, corresponding to the link 47 is pivotally connected to one end of the next centrally pivoted link 43, and the connecting link 49 is then pivotally connected to the opposing end portions of the links 44 and 50. One end of a wire cord 51, or its equivalent, is attached to the central portion of each link 47 in a span $g$, and these cords pass over peripherally grooved pulleys 52, one of which pulleys is carried by each connecting link 49 of a span; and the inner end of each cord or cable 51 is secured in any approved manner to the outer end of a spring 16. When connections are made as stated, it will be observed that the secondary hub is not turned immediately upon the turning of the primary or driving hub, but that the two hubs do not turn in unison until the flexible connection G has been straightened out in the direction in which the wheel is traveling.

When the wheel is traveling forward as shown in Fig. 3, the series of links in the spans which are in direction of movement of the wheel are straightened or tautened, while the slack of the other series of links is taken up automatically by the cables 51 and the springs 16. Thus when a wheel is traveling forward the links 47 and 48 are straight or in end alinement with each other, while the links 44, 49 and 50 are drawn inward by the action of the aforesaid cables and springs; but when the wheel is made to travel backward the reverse is true, the links 44, 49 and 50 will be straightened out and the links 48 and 47 will be buckled or drawn inward by the action of said cables 51 and the springs 16.

In the construction shown in Fig. 2, the driving sprocket B' is secured to the primary hub B. In the construction shown in Fig. 5, a driving sprocket B² is secured in any suitable manner to the inner side face of the inner section $c$ of the secondary hub, said driving sprocket B² being of skeleton formation; and the flange 24 of the hub section $c$ to which the dust guard is secured is located within the said sprocket B².

The construction which is shown in Fig. 4 is that which is particularly adapted for the construction of the front wheels of automobiles, or wheels which are simply idlers and not drivers. In the main the construction shown in Fig. 4 is practically that which is shown in Fig. 2 except that the transmitting wheel D is omitted, and at the central portion of the main or primary hub B an annular flange 53 is formed, shown best in Fig. 8, provided with slotted lugs 54. The flanges 24 shown in the construction of Fig. 2 are omitted, and the rim member of each section $c$ and $c'$ of the secondary hub C is made with the inner sides 55 projecting outward so as to reduce the tread of the wheel when it shall be required, and said projecting sides are provided with suitable glands for the accommodation of pins or pivots in which are secured the springs 56 at one end while the other end is secured to similar pins passing through the lugs 54 of the aforesaid flange 53. It is understood that said rim members 23 of Fig. 4 can be made identical to those shown in Fig. 2, so as to have a free passage for extending the springs 56 from the lugs 54 to the rim 31 of the secondary hub and be secured thereto in any suitable manner if it is desired. Thus it will be observed that while one hub can turn to a very limited extent free of the other hub, both hubs are compelled by the springs 56 to turn together except at the starting or stopping of the rotation of the wheel. It will be further observed that as the power of propulsion of these non-driving wheels is horizontally directed to the inner hub, said springs 56 can counteract any propensity of circular motion of the primary hub irrespective of the secondary hub, and therefore said springs will hold both hubs in position with relation one to the other.

In the construction shown in Fig. 4, instead of dust guards being employed to close the outer openings of the rim members 23 of the secondary hub C, disks 57 are employed for such purpose, it being understood that similar disks can be employed if desired in the construction shown in Fig. 2, and these disks are secured upon or are otherwise attached to the end portions of the main or primary hub B. Each disk 57 is provided with a marginal gutter 58, and an annular groove 59 is made in the outer face of each rim member 23 of said secondary hub, which annular grooves 59 are located between what might be termed the tread portions of said rims members and their outer side surfaces. Corrugated dust guards 60 are also used, but they are shorter than the dust guards employed in the construction shown in Fig. 1. The dust guards 60 are secured in the grooves 59 by clamps 61 of any approved formation, and similar clamps 62 are employed to secure the outer edges of the dust guards to the gutter portions 58 of the flanges 57. It will be understood that the disks 57 can be omitted for drivers or for non-driver wheels when they are intended for light cars, and in this manner all friction is avoided by contact of said disks with the rim members 23 of the secondary hub. When using the said disks 57 there shall be a clearance or space for instance one-eighth of an inch betweeen them and the outer edges of the rim members 23, so that there will be no friction of said parts until a great shock carries the vehicle on one side or the other, and then the said disks act as retainers to hold the wheels in their normal position. In a shock of this nature its impact is almost reduced to a minimum when the disks come in contact with the secondary hub, by reason of the pneumatic tubes absorbing most of the shock in all directions. It will also be observed that the construction of the wheel as shown in Fig. 4, requires that the pipe connection for the twin tubes shall pass upon the adjacent spacing block and not through the rim 31 of the secondary hub C, as is shown in Fig. 2.

With reference to the construction shown in Fig. 7, this construction is adaptable to either the type of wheel shown in Fig. 4 or the type of wheel shown in Fig. 2, and differs mainly in that the rim 64 is integral with the rim members 23 of the secondary hub C. When constructing the integral rim, ring flanges 62$^a$ extend out from the inner side faces of the said rim members 23, and near their outer edges these ring flanges are provided with annular interiorly located ribs 63, which when the ring flanges are brought together constitute a partition, and the said ribs can be shaped or adjusted as may be required for establishing or fixing their concentric relation to one another. Below this partition the said ring flanges are semi-circular or segmental in cross section, while above said partition the said flanges extend outwardly and constitute a compartment in which the spokes 65 are introduced and the spacing blocks 66. In this form of a rim each one is a section by itself and they are connected by bolts 67 passed through them and also through the entering ends of the spokes 65, and the bolts 33 heretofore described can be utilized to hold the spacing blocks in place.

With reference to the construction shown in Fig. 6, it is likewise adaptable to the type of wheel shown in either Fig. 2 or in Fig. 4. It differs, however, from the construction disclosed in both Figs. 2 and 4 in that the body sleeves 17$^a$ of the primary hub B are made in two sections or twin members 68 and 69. Each section of the body sleeve 17$^a$ is provided with an exterior annular flange 70 having a band 71 on its inner face which bands 71 are brought together when the sections 68 and 69 of the body sleeve engage, and form outer channels 72, in which the ribs 38 on the pneumatic tubes F are introduced and held. The sections 68 and 69 of the body sleeves 17$^a$ are held together by bolts 73, or their equivalents, passed through the said flanges below the bands 71, the bolts being provided with suitable nuts.

The new principle referred to in the preamble of this specification and forming part of the invention is as follows: The normal exterior diameter of the pneumatic tubes F will be slightly larger, for example, one-sixteenth of an inch greater in diameter, than the interior diameter of the rim members 23 of the secondary hub C against which they have bearing, while the normal interior diameter of said tubes F as well as their normal diameter in cross section will be smaller than when they are inflated with air, so that upon inflation to their maximum capacity they will fit snugly to the said rims 23, and at such time the interior portion of the tubes F will have been reduced approximately to the exterior diameter of the confining flanges 18 and 19 in Fig. 2. In this manner the pneumatic tubes F will be secured in position even under the severest usage they may be subjected to upon the road. Another object attained by making the tubes F of larger diameter than that of their confining rims 23 is that the fabric material forming part of the tubes will not be subjected to as much tension as if the expansion or dilation should take place in a manner to enlarge the tube in its outside diameter, which can not be done due to the presence of the said confining rims 23, since the air pressure does not tend to expand the said tube, but rather the tendency of said air pressure is to contract or shrink the tubes at their interior portions, dilating them only very little in cross section, and under these conditions the life and flexibility of the tubes are greatly augmented. In practice, however, it may be found convenient to make the exterior normal diameter of the said tubes F equal to the diameter of the chambers in the secondary hub where they are located, without impairing in the least the properties of the pneumatic tubes as has been described. It may be here again particularly noted that at the inner side of the wheel the pneumatic tube is slightly larger in its exterior and interior diameter than is the tube at the outer side of the said wheel, in order that the material of the primary hub shall not be thinner on one side than on the other on account of the tapering form of the axle spindle.

Having thus described my invention, I claim as new, and desire to secure by Letters Patent,—

1. In vehicle wheels, twin pneumatic tubes placed, under the principle described, within lateral supports of the secondary hub in connection with the body sleeves, and a primary hub in two sections, each section corresponding to each of the said lateral supports, and means carried by the primary hub for compressing the inner peripheral surfaces of said tubes.

2. In vehicle wheels, a primary hub provided with a central annular member and adjacent thereto two parallel sections as described, a secondary hub comprising two main members, the same constituting a spoke-receiving section and two concaved rim members parallel to each other, connections between the spoke sections and rim members, twin pneumatic tubes adapted to fill said rim members and to be tightened therein when they are inflated with air, and means for clamping the inner peripheral surfaces of the tubes.

3. In vehicle wheels, the combination with an axle, a primary hub in two sections, a secondary hub in two sections mounted to turn upon the primary hub, body sleeves mounted to turn on the primary hub, twin pneumatic tubes held within the lateral members of the secondary hub and in contact with the said body sleeves, means for inflating the said tubes, and tension controlled connections located between the primary and the secondary hubs and in the line of their central vertical sections.

4. In vehicle wheels, the combination with an axle, a primary hub, a secondary hub in two sections mounted to turn upon the primary hub, body sleeves mounted to turn on the primary hub, between it and the lateral members of the secondary hub, said body sleeves being independent of the said sections of the secondary hub, twin pneumatic tubes held between the said members of the secondary hub and the primary hub, means for inflating the said tubes and tension-controlled connections between the primary hub and the spoke ring section of the secondary hub, the said connections permitting limited independent movement of the hubs in all directions and impelling said hubs to turn together when the limit of their independent circular movement has been reached.

5. In a vehicle wheel, a primary and a secondary hub as described, flexible chain connections between the two hubs, means for controlling the said connections as described, twin pneumatic tubes parallel to each other carried by the secondary hub, the latter consisting of a central ring section connected to lateral rim supports or sections one on each side of the wheel, and means for simultaneously inflating both tubes, as described.

6. In vehicle wheels, a primary and a secondary hub, the said secondary hub consisting of a central spoke-receiving section attached to lateral rim supports or sections surrounding the pneumatic tubes and the corresponding sleeve sections of the primary hub, flanges carried by the sleeve sections of the said primary hub, the said tubes being laid side by side, each tube being provided with an inner rib held between said flanges, means for inflating the tubes, and pliable spring-controlled connections between the primary and the secondary hubs.

7. In a vehicle wheel, a primary hub in two sections, a secondary hub in two sections mounted to turn on the primary hub, the secondary hub consisting of two integral sections parallel to each other, forming a spoke-receiving section, an inner circular chamber and two rim sections in which the pneumatic tubes are located, surrounding the sleeve and rim sections of the primary hub, the said tubes being provided with ribs at their inner faces, clamping devices for the said ribs carried by the sleeve sections of the primary hub, and means for inflating the tubes.

8. In vehicle wheels, a primary hub, a secondary hub mounted to turn on the primary hub, both hubs in combination with inner sleeve sections, a spoke-receiving section connected with the rim sections of the secondary hub, pneumatic tubes located between the sleeve sections and rim sections of the secondary hub, the said tubes being provided with ribs at their inner faces, clamping devices for the said ribs carried by the sleeve sections connecting with said tubes, flexible elements in direct connection between the inner hub and the outer hub, spring and cable connections for controlling said elements, means for driving the hubs, corrugated dust-guards for the said hubs, and clamps for holding the dust-guards in place, one at each side of the wheel at its hub portion.

9. In a vehicle wheel, a primary hub provided with an external transmitting wheel at its center, a secondary hub in two sections, the sections being located at each side of the transmitting wheel, each section of said secondary hub comprising an outer member and a rim member mounted to turn on the primary hub, a corresponding inner sleeve for each secondary hub section surrounding the inner hub, a pneumatic tube held between the sleeve and the rim member of each section of said secondary hub, chain connections between the transmitting wheel and the central rim member of the secondary hub, and tensional connections between the primary and secondary hubs.

10. In a vehicle wheel, a primary hub provided with an external transmitting wheel attached at its center, a secondary hub in two sections, the sections being located at each side of said transmitting wheel, each section of said secondary hub comprising an inner sleeve member mounted to turn on the said primary hub and a surrounding rim member, a pneumatic tube held between the sleeve and the rim member of each section of said secondary hub, chain connections between the transmitting wheel and the rim members of the secondary hub, springs carried by said transmitting wheel, and cables connecting said springs with the said chains, whereby to take up the slack in said chains between the points of the transmitting wheel.

11. In a vehicle wheel, a primary hub, a transmitting wheel secured to said hub, a secondary hub constructed in sections as described, located one at each side of the transmitting wheel, each of said sections including an inner twin sleeve member mounted on the primary hub, a pneumatic tube carried by each section of the secondary hub, being fitted between the members thereof, said tubes being provided with inner annular ribs, clamping devices carried by the twin sleeves of said secondary hub, engaging with the ribs of the said tubes, means for inflating the tubes, and flexible, tension-controlled power transmitting elements pivotally connected with the transmitting wheel, and also pivotally connected with the central rim section of the secondary hub.

In testimony whereof I have signed my name to this specification in the presence of two subscribing witnesses.

MANUEL GONZALEZ BABIO.

Witnesses:
J. FRED ACKER,
JNO. M. RITTER.